United States Patent
Kitaguchi et al.

(10) Patent No.: US 10,022,891 B2
(45) Date of Patent: Jul. 17, 2018

(54) MANUFACTURING METHOD OF HONEYCOMB STRUCTURE, AND HONEYCOMB FORMED BODY

(71) Applicant: NGK INSULATORS, LTD., Nagoya (JP)

(72) Inventors: Daniel Yukichi Kitaguchi, Nagoya (JP); Takehiko Watanabe, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 129 days.

(21) Appl. No.: 15/013,143

(22) Filed: Feb. 2, 2016

(65) Prior Publication Data
US 2016/0243723 A1 Aug. 25, 2016

(30) Foreign Application Priority Data
Feb. 24, 2015 (JP) .................. 2015-033603

(51) Int. Cl.
| | |
|---|---|
| C04B 33/32 | (2006.01) |
| C04B 35/64 | (2006.01) |
| B28B 11/12 | (2006.01) |
| B28B 3/20 | (2006.01) |
| B01J 35/04 | (2006.01) |
| B01J 37/00 | (2006.01) |
| B01J 37/08 | (2006.01) |

(Continued)

(52) U.S. Cl.
CPC ............ B28B 3/20 (2013.01); B01D 46/2451 (2013.01); B01J 35/04 (2013.01); B01J 37/0009 (2013.01); B01J 37/08 (2013.01); B28B 11/08 (2013.01); B28B 11/12 (2013.01); B28B 11/243 (2013.01); B28B 11/248 (2013.01); C04B 33/32 (2013.01); B28B 2003/203 (2013.01)

(58) Field of Classification Search
CPC .......... C04B 33/32; C04B 35/64; B28B 11/12
USPC ................... 264/605–609, 671–673
See application file for complete search history.

(56) References Cited

U.S. PATENT DOCUMENTS 4,786,542 A * 11/1988 Yasuda .................. C04B 33/32
156/89.22
5,149,264 A * 9/1992 Horikawa ............. B28B 11/243
432/2

(Continued)

FOREIGN PATENT DOCUMENTS

| JP | 2000-274954 A1 | 10/2000 |
|---|---|---|
| WO | 2006/035674 A1 | 4/2006 |
| WO | 2014/038485 A1 | 3/2014 |

OTHER PUBLICATIONS

Extended European Search Report (Application No. 16155255.9) dated Jul. 29, 2016.

*Primary Examiner* — Erin Snelting
(74) *Attorney, Agent, or Firm* — Burr & Brown, PLLC

(57) ABSTRACT

A manufacturing method of the honeycomb structure has a forming step of forming a honeycomb formed body having partition walls defining a plurality of cells; a convex end portion forming step of forming a convex end portion including a convex end face in the obtained honeycomb formed body; a mounting step of directing downward one end face on which the convex end portion is formed and mounting the honeycomb formed body on a shelf plate; a firing step of firing the honeycomb formed body mounted on the shelf plate to form a honeycomb fired body; and an end face grinding step of grinding one end face of the honeycomb fired body to remove the convex end portion.

7 Claims, 3 Drawing Sheets

(51) Int. Cl.
    *B28B 11/08*     (2006.01)
    *B01D 46/24*     (2006.01)
    *B28B 11/24*     (2006.01)

(56) References Cited

U.S. PATENT DOCUMENTS

| | | | | |
|---|---|---|---|---|
| 5,256,347 | A * | 10/1993 | Miyahara | B01D 39/2075 264/40.6 |
| 5,316,710 | A * | 5/1994 | Tasaki | C04B 35/64 264/630 |
| 5,529,732 | A * | 6/1996 | Ideguchi | C04B 35/195 264/607 |
| 7,488,412 | B2 * | 2/2009 | Abe | B01D 46/0024 208/179 |
| 2006/0165956 | A1 | 7/2006 | Souda | |
| 2008/0116621 | A1 * | 5/2008 | Brennan | F27B 9/10 264/606 |
| 2008/0142149 | A1 | 6/2008 | Noguchi et al. | |
| 2012/0013052 | A1 * | 1/2012 | Schumann | F27D 5/00 264/629 |
| 2014/0131926 | A1 * | 5/2014 | Geismar | C04B 33/32 264/605 |
| 2015/0239785 | A1 | 8/2015 | Ikeshita | |
| 2016/0137558 | A1 * | 5/2016 | Watanabe | F27D 3/12 264/630 |
| 2017/0274365 | A1 * | 9/2017 | Kitaguchi | B01J 35/04 |

* cited by examiner

MANUFACTURING METHOD OF HONEYCOMB STRUCTURE, AND HONEYCOMB FORMED BODY

The present application is an application based on JP 2015-033603 filed on Feb. 24, 2015 with the Japan Patent Office, the entire contents of which are incorporated herein by reference.

BACKGROUND OF THE INVENTION

Field of the Invention

The present invention relates a manufacturing method of a honeycomb structure, and a honeycomb formed body. More particularly, it relates to a manufacturing method of a honeycomb structure in which an unfired honeycomb formed body extruded by using an extruder is fired in a firing furnace, and a honeycomb formed body.

Description of Related Art

Heretofore, a honeycomb structure made of ceramics has broadly been used in a use application such as a car exhaust gas purifying catalyst carrier, a diesel particulate removing filter, or a heat reservoir for a burning device. The honeycomb structure made of the ceramics (hereinafter simply referred to as "the honeycomb structure") is manufactured by preparing a forming raw material (a kneaded material), forming a honeycomb formed body by extruding the material into a desirable honeycomb shape by use of an extruder, followed by raw cutting, drying and finish-cutting, and then subjecting the honeycomb formed body to a firing step of firing the honeycomb formed body at a high temperature.

In above firing step, the honeycomb formed body is mounted on a shelf plate in a state where one end face of the honeycomb formed body is directed downward, and the honeycomb formed body is thrown together with the shelf plate into a firing furnace. At this time, for the purpose of preventing the honeycomb formed body from being adhered to the shelf plate, suitably keeping end faces of a honeycomb structure to be formed and preventing a disadvantage such as end face crack from being generated, a firing support plate called "a setter" is usually interposed between the shelf plate and the honeycomb formed body. As this setter, for example, a sliced piece of the honeycomb structure obtained by firing the honeycomb formed body is used, and the setter is repeatedly usable.

However, when the setter is repeatedly used, cracks or the like are generated, and hence a press-molded and fired ceramic raw material called "a pressed setter" is used, and is also repeatedly usable (e.g., Patent Document 1). Such setters are generically called "a firing setter". In addition, especially in a case where the honeycomb formed body including thin cell partition walls is fired, a firing raw setter (hereinafter simply referred to as "the raw setter") obtained by slicing an unfired honeycomb formed body made of the same material as in the honeycomb formed body is used in the firing step (e.g., see Patent Document 2). It is to be noted that in the present description, the extruded body before fired is defined as "the honeycomb formed body", and the fired honeycomb formed body is defined as "the honeycomb structure".

[Patent Document 1] JP-A-2000-274954
[Patent Document 2] WO 2006/035674

SUMMARY OF THE INVENTION

An extruded honeycomb formed body performs a firing shrinkage along a cell longitudinal direction and a direction perpendicular to the cell longitudinal direction in a firing step. Consequently, in a case where the honeycomb formed body is mounted on the above-mentioned firing setter and thrown into a firing furnace, a shift occurs between an upper surface of the firing setter and a lower end face of the honeycomb formed body due to the firing shrinkage of the honeycomb formed body, and defects such as deformation and crack of cell partition walls might be generated in a lower end face of a honeycomb structure which comes in contact with the firing setter. Additionally, sticking occurs between the lower end face of the honeycomb formed body and the upper surface of the firing setter, the shift or the like do not uniformly occur, and strain might occur in a shape of the lower end face of the honeycomb structure. In a case where the strain occurs, a roundness defect of the end face is generated in the round pillar-shaped honeycomb structure. Especially in a case where the honeycomb formed body including thin cell partition walls defining a plurality of cells is fired, the above defects are remarkably generated.

On the other hand, in a case where the above raw setter is used, the raw setter is made of the same material as in the honeycomb formed body as a firing object, and hence a firing shrinkage difference between the honeycomb formed body and the raw setter during the firing is not made. Therefore, the raw setter can perform a firing shrinkage along the cell longitudinal direction and a cross-sectional direction perpendicular to the cell longitudinal direction at the same timing and the same ratio as in the honeycomb formed body. Consequently, it is possible to eliminate a disadvantage in a case where the firing setter is used. However, in a case where a shape of the raw setter is unsuitable, the raw setter receives restriction of a shelf plate and can only isotropically perform the firing shrinkage, and the firing shrinkage difference might be made between the raw setter and the honeycomb formed body to be mounted on the raw setter. As a result, the cell partition walls of the honeycomb formed body might be deformed on the side of a raw setter mounting surface, or a shape accuracy (e.g., a roundness) of the honeycomb formed body might be adversely affected. Furthermore, the raw setter is not repeatedly usable, and also becomes a factor to increase firing cost in the firing of the honeycomb formed body.

Thus, the present invention has been developed in view of the above situation of the conventional technology, and an object thereof is to provide a manufacturing method of a honeycomb structure in which a setter is not used and hence it is possible to alleviate generation of a defect in an end face of the honeycomb structure and to suppress firing cost, and a honeycomb formed body for use in the manufacturing method.

According to the present invention, there are provided a manufacturing method of a honeycomb structure which achieves the above object, and a honeycomb formed body.

According to a first aspect of the present invention, a manufacturing method of a honeycomb structure is provided including a forming step of forming a forming raw material, and forming a honeycomb formed body having partition walls defining a plurality of cells which extend from one end face to the other end face and which become through channels for a fluid, by extrusion, cutting and drying; a convex end portion forming step of forming a convex end portion projecting from the vicinity of a center of the one end face of the honeycomb formed body obtained by the forming step along a central axis direction of the honeycomb formed body and including a planar convex end face, and processing the one end face so that its cross section has a convex shape; a mounting step of directing downward the side of the one end face on which the convex end portion is formed, and mounting the honeycomb formed body on a shelf plate so that a part of the convex end portion abuts on a shelf plate surface; a firing step of firing the honeycomb formed body mounted on the shelf plate, to form a honeycomb fired body; and an end face grinding step of grinding the one end face of the honeycomb fired body obtained by the firing step, to remove the convex end portion.

According to a second aspect of the present invention, the manufacturing method of the honeycomb structure according to the above first aspect is provided, wherein the convex end portion includes a convex peripheral surface perpendicular to the convex end face and possesses a thin disc form.

According to a third aspect of the present invention, the manufacturing method of the honeycomb structure according to the above first aspect is provided, wherein the convex end portion further has a chamfered portion obtained by chamfering the one end face in an oblique direction and having a cross section possessing a tapered shape in which a diameter of the convex end face is smaller than an outer diameter of the honeycomb formed body.

According to a fourth aspect of the present invention, the manufacturing method of the honeycomb structure according to the above third aspect is provided, wherein the convex end portion further has a flat surface portion which is bent from one end of the chamfered portion to become parallel to the convex end face.

According to a fifth aspect of the present invention, the manufacturing method of the honeycomb structure according to any one of the above first to fourth aspects is provided, wherein an area ratio R of an area of the convex end face to a sectional area of the honeycomb formed body is from 15 to 30%.

According to a sixth aspect of the present invention, the manufacturing method of the honeycomb structure according to any one of the above first to fifth aspects is provided, wherein a height of the convex end portion from a corner portion of the one end face is from 0.3 to 3 mm.

According to a seventh aspect of the present invention, the manufacturing method of the honeycomb structure according to any one of the above first to sixth aspects is provided, wherein a thickness of a ground and removed portion to remove the convex end portion is from 0.5 to 3 mm.

According to an eighth aspect of the present invention, a honeycomb formed body for use in the manufacturing method of the honeycomb structure according to any one of the above first to seventh aspects is provided, which has a convex end portion projecting from the vicinity of a center of one end face along a central axis direction, and having a planar convex end face, wherein the one end face is processed so that its cross section has a convex shape.

According to a ninth aspect of the present invention, the honeycomb formed body according to the above eighth aspect is provided, wherein the convex end portion includes a convex peripheral surface perpendicular to the convex end face, and possesses a disc form.

According to a tenth aspect of the present invention, the honeycomb formed body according to the above eighth aspect is provided, wherein the convex end portion further has a chamfered portion obtained by chamfering the one end face in an oblique direction and having a cross section possessing a tapered shape in which a diameter of the convex end face is smaller than an outer diameter.

According to an eleventh aspect of the present invention, the honeycomb formed body according to the above tenth aspect is provided, wherein the convex end portion further has a flat surface portion bent from one end of the chamfered portion so that the flat surface portion is parallel to the convex end face.

According to a manufacturing method of a honeycomb structure of the present invention, the honeycomb structure suitably holding cell partition walls of an end face and a shape accuracy can be manufactured without using a setter. Additionally, a honeycomb formed body of the present invention is usable in the above manufacturing method.

DETAILED DESCRIPTION OF THE PRESENT INVENTION

Hereinafter, an embodiment of a manufacturing method of a honeycomb structure and an embodiment of a honeycomb formed body of the present invention will be described in detail with reference to the drawings. It is to be noted that the manufacturing method of the honeycomb structure of the present invention and the honeycomb formed body are not limited to the following embodiments, and various design change, modification, improvement or the like can be added without departing from the gist of the present invention.

Figure 1:
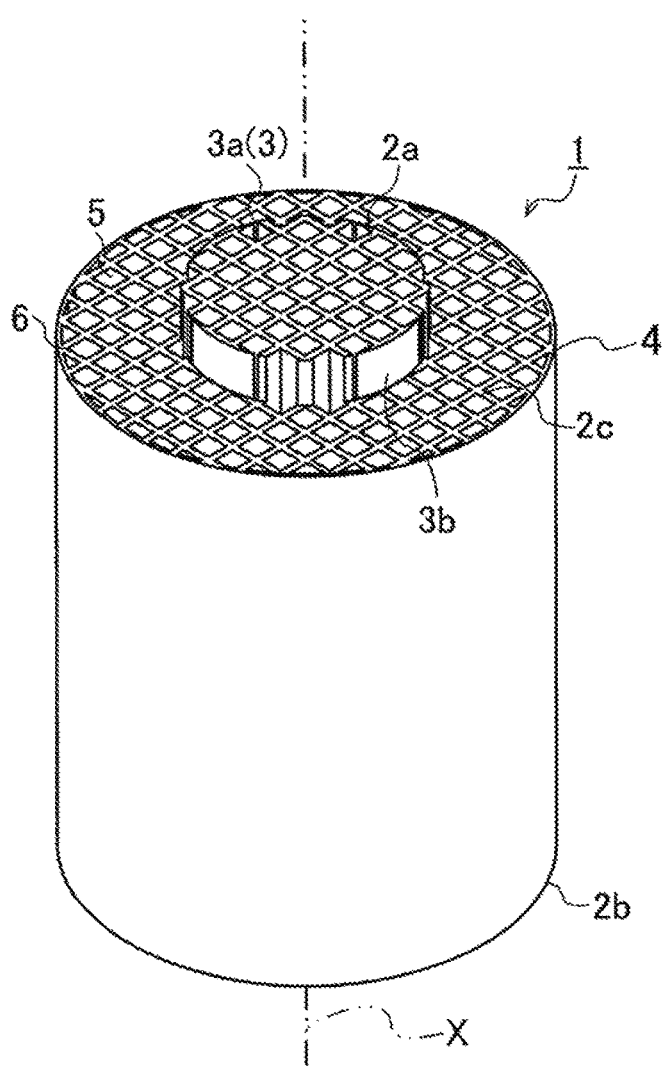
FIG. 1 is a perspective view showing a schematic constitution of a honeycomb formed body of an embodiment of the present invention.
Figure 2:
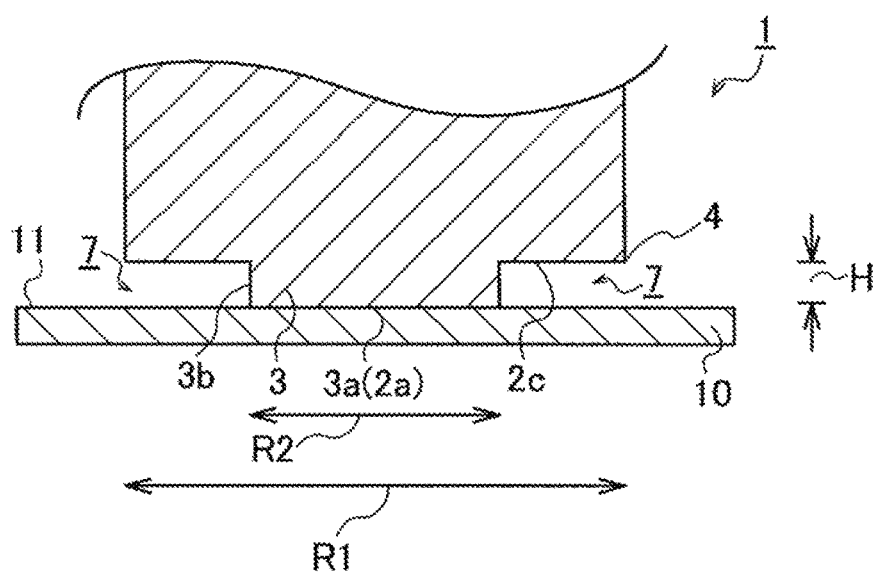
FIG. 2 is a partially enlarged cross-sectional view showing a schematic constitution of the honeycomb formed body mounted on a shelf plate.

As shown in FIG. 1 and FIG. 2, a honeycomb formed body 1 of one embodiment of the present invention has a convex end portion 3 in the form of a thin disc schematically possessing a round pillar shape as a whole, projecting from the vicinity of a center of one end face 2a along a central axis direction X (see FIG. 1) and including a planar convex end face 3a and a convex peripheral surface 3b perpendicular to the convex end face 3a. In consequence, the honeycomb formed body 1 is processed so that its cross section has a convex shape in which the vicinity of the center of the one end face 2a swells. A manufacturing method 100 of a honeycomb structure in which the honeycomb formed body 1 is used will be described with reference to FIG. 3. It is to be noted that in FIGS. 1 to 5, cells and partition walls which appear in an end face of the honeycomb formed body 1 are partially omitted from the drawings.

The honeycomb formed body 1 is obtained by preparing a forming raw material (a kneaded material) and extruding the material into a desirable shape by use of an extruder, and after the body is extruded by the extruder, the body is formed on the basis of the round pillar-shaped honeycomb formed body 1 cut into a predetermined length (raw cutting), dried and finish-cut (a forming step). In the honeycomb formed body 1 of the present embodiment, the one end face 2a of the round pillar-shaped honeycomb formed body 1 formed by the forming step is to grind and processed into a round shape with a cup type grinding wheel or the like, and there is formed the convex end portion 3 including the convex end face 3a in which the vicinity of a center projects from a corner portion 4 of the one end face 2a and which is parallel to an annular flat surface portion 2c formed in the one end face 2a (a convex end portion forming step).

It is to be noted that FIG. 1 shows a state where the one end face 2a is directed upward, for simplification of the drawing. Additionally, FIG. 3 similarly shows a state where the one end face 2a is directed upward, except a view (the second from the left) showing that the honeycomb formed body 1 is to be mounted on a shelf plate 10.

The honeycomb formed body 1 has a plurality of cells 5 which extend from the one end face 2a to the other end face 2b and which become through channels for a fluid and has latticed partition walls 6 defining the cells 5. Here, an area ratio R (R2/R1×100) of an area R2 of the convex end face 3a of the convex end portion 3 to a sectional area R1 of the honeycomb formed body 1 is set to a range of 15 to 30% (see FIG. 2). FIG. 2 shows the sectional area R1 and the area R2 which are shown in diameter portions of the honeycomb formed body 1 and the convex end face 3a, respectively.

Here, in a case where the area ratio R is in excess of 30%, an area of the honeycomb formed body which directly comes in contact with the shelf plate 10 increases, and the honeycomb formed body is easy to be influenced by a firing shrinkage in firing. On the other hand, in a case where the area ratio R is below 15%, a load of the honeycomb formed body 1 is disadvantageously supported by the convex end face 3a of a narrow area, and hence the honeycomb formed body becomes unable due to a vibration during the firing, or is easy to be deformed by concentration of the load. Therefore, the area ratio R is set to the above range. Here, there is not any special restriction on a convex end portion height H (corresponding to a height of the convex peripheral surface 3b) from the corner portion 4 of the one end face 2a to the convex end face 3a of the convex end portion 3, but the height can be set to, e.g., a range of 0.3 to 3 mm.

Here, in a case where the convex end portion height H is smaller than 0.3 mm, a clearance space 7 between the honeycomb formed body and a shelf plate surface 11 of the shelf plate 10 decreases in an after-mentioned mounting step, and there is the possibility that the corner portion 4 of the one end face 2a comes in contact with a part of the shelf plate surface 11. On the other hand, when the convex end portion height H is larger than 3 mm, a grinding amount to form the convex end portion 3 in the convex end portion forming step of the formed body increases, a grinding amount to remove the convex end portion 3 in an end face grinding step increases, and much time is required to remove the convex end portion 3. Therefore, the convex end portion height H is set to the range of 0.3 to 3 mm.

The honeycomb formed body 1 formed through the forming step and the convex end portion forming step are mounted on the shelf plate surface 11 of the shelf plate 10 by directing the one end face 2a downward (the mounting step). At this time, the clearance space 7 is made, as much as a distance corresponding to the convex end portion height H of the convex end portion 3, between the corner portion 4 of the one end face 2a and the shelf plate surface 11 by the convex end portion 3 formed on the honeycomb formed body 1. That is, in a case where the honeycomb formed body 1 is mounted on the shelf plate 10, the one end face 2a does not entirely abut on the shelf plate surface 11. A firing step is performed in a state where the honeycomb formed body 1 is mounted on the shelf plate 10.

The shelf plate 10 for use is made of a heat resistant ceramic material, and does not cause the firing shrinkage even at a high firing temperature. Additionally, an area of the shelf plate surface 11 of the shelf plate 10 is formed to be larger than that of the one end face 2a of the honeycomb formed body 1. Therefore, the honeycomb formed body 1 mounted on the shelf plate 10 does not project from the shelf plate 10.

In consequence, the honeycomb formed body 1 has the convex end portion 3 in the vicinity of its center and is therefore disposed in a state where the vicinity of the corner portion 4 of the one end face 2a is floated above the shelf plate surface 11 of the shelf plate 10. That is, the vicinity of the corner portion 4 of the one end face 2a is not influenced from the outside.

The honeycomb formed body 1 mounted on the shelf plate 10 is thrown into a firing furnace, and firing is performed at a predetermined firing temperature for predetermined firing time (the firing step). In consequence, the firing of the honeycomb formed body 1 is completed, and a honeycomb fired body 20 is formed. By the firing step, a ceramic raw material is sintered, and firing shrinkages are generated along a longitudinal direction (corresponding to the central axis direction X) of the honeycomb formed body 1 and a cross-section perpendicular to the longitudinal direction, respectively. At this time, the vicinity of the corner portion 4 of the one end face 2a of the honeycomb formed body 1 which is present at a position floated from the shelf plate surface 11 does not directly come in contact with the shelf plate 10 as described above, and there are not any factors that disturb the firing shrinkages. The other end face 2b becomes an upper surface during the firing and, therefore, is not restricted, and there are not any factors that disturb the firing shrinkages.

Consequently, an isotropic firing shrinkage is performed along the longitudinal direction and the cross section perpendicular to this longitudinal direction. That is, when the area where the honeycomb formed body 1 comes in contact with the shelf plate 10 is decreased as much as possible, a disadvantage such as deformation of the latticed partition walls 6 defining the cells 5 is generated in the convex end face 3a of the one end face 2a, but is not generated in the vicinity of the corner portion 4. As a result, a defect due to the deformation of the partition walls 6 or partition wall cracks, a roundness defect or the like is not caused in the one end face 2a of the honeycomb fired body 20 after the firing is performed. In consequence, it is possible to eliminate a problem such as the defect in the firing step, and it is possible to form the honeycomb fired body 20 having high quality such as high shape stability.

Figure 3:
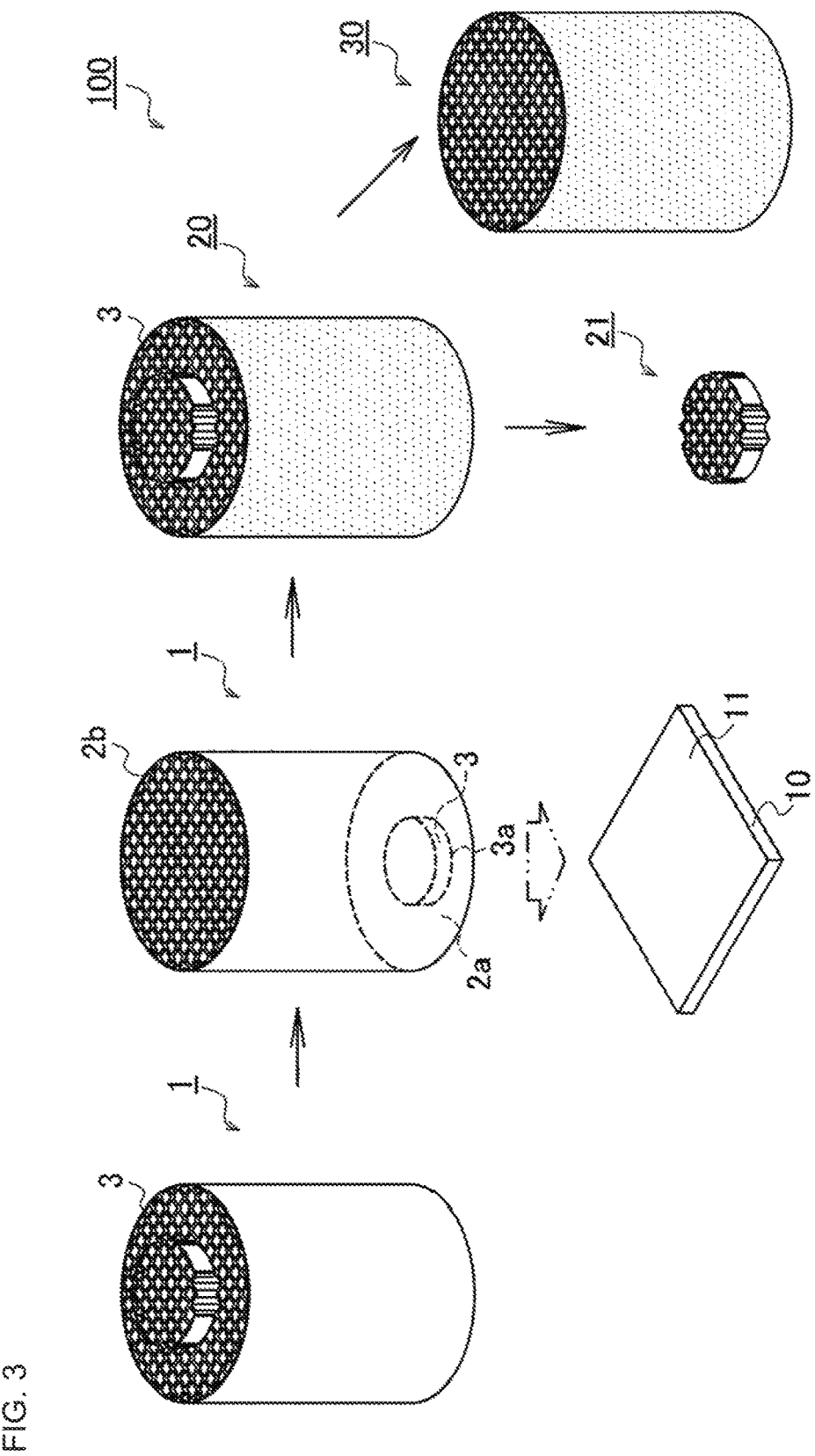
FIG. 3 is an explanatory view schematically showing a schematic constitution of a manufacturing method of a honeycomb structure of the present embodiment.

In the obtained honeycomb fired body 20, the convex end portion 3 in the form of a disc remains to be formed in the vicinity of the center of the one end face 2a (see FIG. 3). Therefore, a rotating cup type grinding wheel (not shown) is gradually brought close to the honeycomb fired body from a position facing the one end face 2a, while rotating the honeycomb fired body 20 based on the central axis direction X as a rotation axis (the end face grinding step). Consequently, the convex end portion 3 is gradually cut off and removed. In consequence, manufacturing of a round pillar-shaped honeycomb structure 30 is completed. It is to be noted that FIG. 3 schematically shows a ground and removed portion 21 constituted of the convex end portion 3 cut off by the cup type grinding wheel. For the purpose of obtaining a suitable flatness of the end face after the end face is ground, the end face 2a is preferably ground as much as the height of the convex end portion 3 or more.

A depth of a disadvantage such as the deformation of the partition walls 6 which is generated in the convex end face 3a is usually about 0.5 mm, and hence for the purpose of removing the disadvantage of the end face 2a, it is necessary to grind the end face as much as 0.5 mm or more. A maximum height of the convex end face 3a is 3 mm, and hence the end face does not have to be ground as much as 3 mm or more.

Figure 4:
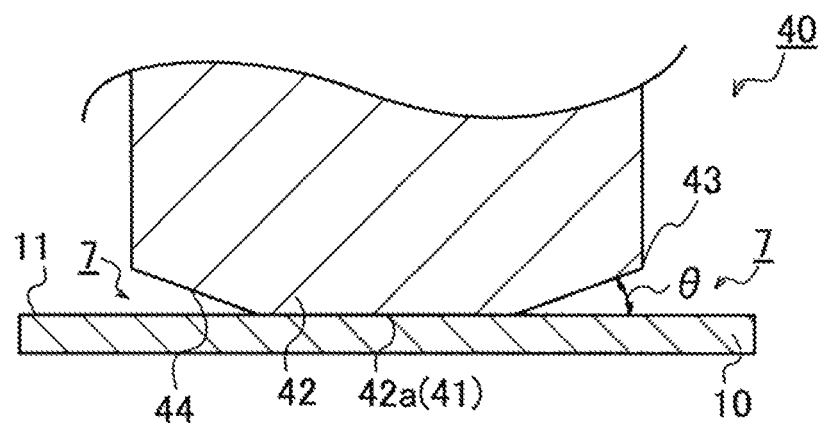
FIG. 4 is a partially enlarged cross-sectional view showing a schematic constitution of a honeycomb formed body of another example constitution of the present invention which is mounted on a shelf plate.

As another example constitution of the present invention, a honeycomb formed body 40 having a constitution shown in FIG. 4 can be illustrated. FIG. 4 is a perspective view showing a schematic constitution of the honeycomb formed body 40 of the other example constitution of the present invention.

As shown in FIG. 4, the honeycomb formed body 40 of the other example constitution is formed so that its cross section of a convex end portion 42 formed on one end face 41 of the honeycomb formed body 40 possesses a tapered shape. That is, a corner portion 43 of the one end face 41 is chamfered in an oblique direction, and has a chamfered portion 44 so that a diameter of a convex end face 42a is smaller than an outer diameter of the honeycomb formed body 40.

Here, in a case where the one end face 41 is directed downward and the honeycomb formed body 40 of the other example constitution is mounted on a shelf plate surface of a shelf plate 10, a clearance space 7 is formed at an angle θ to be formed between the chamfered portion 44 and a shelf plate surface 11. Here, such angle θ to be formed is set to a range of 0.5 to 5°.

Consequently, at a position floated from the shelf plate surface 11, the chamfered portion 44 of the convex end portion 42 of the honeycomb formed body 40 does not directly come in contact with the shelf plate 10, and there are not any factors that disturb a firing shrinkage during a firing step. In consequence, an isotropic firing shrinkage is performed along a longitudinal direction and a cross section perpendicular to this longitudinal direction.

That is, an area where the honeycomb formed body 40 comes in contact with the shelf plate 10 is decreased as much as possible, and the angle θ to be formed between the chamfered portion 44 and the shelf plate surface 11 is defined, whereby the honeycomb formed body 40 can maintain a restoring force even when the honeycomb formed body swings on the shelf plate 10 due to a vibration during the firing. Furthermore, in the one end face 41, a disadvantage such as deformation of latticed partition walls 6 defining cells 5 is not generated. As a result, a defect due to the deformation of the partition walls, a defect due to partition wall cracks, a roundness defect or the like is not generated in one end face of a honeycomb fired body after the honeycomb formed body is fired. In consequence, it is possible to eliminate a problem of the defect in a firing step or the like, and it is possible to form the honeycomb fired body having high quality such as high shape stability.

Figure 5:
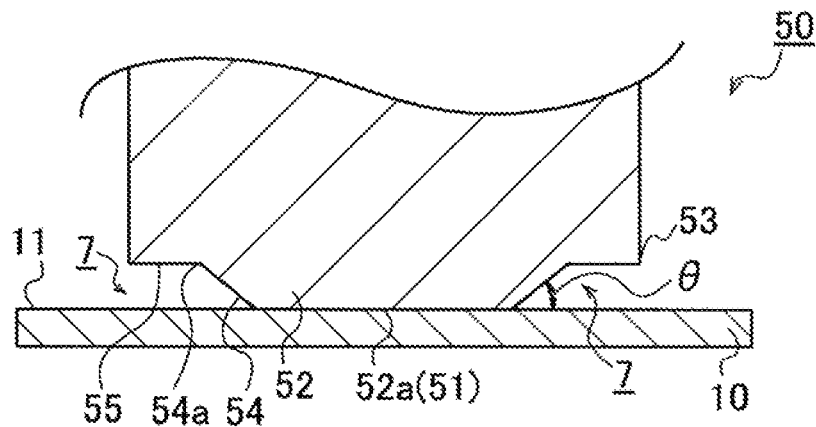
FIG. 5 is a partially enlarged cross-sectional view showing a schematic constitution of a honeycomb formed body of still another example constitution of the present invention which is mounted on a shelf plate.

FIG. 5 is a partially enlarged cross-sectional view showing a schematic constitution of a honeycomb formed body 50 of still another example constitution which is mounted on a shelf plate. Here, in the honeycomb formed body 50, a convex end portion 52 formed on one end face 51 is constituted of a combination of the shape of the convex end portion 3 of the honeycomb formed body 1 mentioned above and the shape of the convex end portion 42 of the honeycomb formed body 40 of the other example constitution. That is, the honeycomb formed body 50 has a chamfered portion 54 formed by chamfering the vicinity of the convex end face 52a of the convex end portion 52 in an oblique direction toward a corner portion 53 and having a cross section possessing a tapered shape in which a diameter of the convex end face 52a is smaller than an outer diameter of the honeycomb formed body 50, and a flat surface portion 55 which is bent from one end 54a of the chamfered portion to become parallel to the convex end face 52a.

Here, in a case where the one end face 51 is directed downward and the honeycomb formed body 50 of the other example constitution is mounted on a shelf plate surface of a shelf plate 10, a clearance space 7 is formed at an angle θ to be formed between the chamfered portion 54 and a shelf plate surface 11, and surrounded from the upside by the flat surface portion 55.

The present invention is effectively applied to an integrated product of a honeycomb structure whose circumference is not processed, and is especially noticeably effective in a thin wall product (e.g., a partition wall thickness is 0.15 mm or less) in which cell partition walls are easy to be deformed. On the other hand, the present invention is also applicable to a circumference processed product or a honeycomb structure in which cell partition walls are comparatively thick.

Hereinafter, the honeycomb formed body of the present invention and the manufacturing method of the honeycomb structure in which this honeycomb formed body is used will be described on the basis of examples mentioned below, but the honeycomb formed body of the present invention and the manufacturing method of the honeycomb structure are not limited to these embodiments.

EXAMPLES (1) Forming Step and Convex End Portion Forming Step

There were prepared a plurality of honeycomb formed bodies each of which had a convex end portion in one end face and in each of which an area ratio R and an angle θ to be formed between a shelf plate surface and a chamfered portion matched the above ranges, respectively, by forming steps and convex end portion forming steps in which the same kneaded material was used and forming conditions and the other conditions were constant (Examples 1 to 12). Furthermore, honeycomb formed bodies were prepared in each of which an area ratio R in the above parameters departed from the above range (Comparative Examples 1 to 8) (see Table 1). It is to be noted that in Table 1, when the angle θ to be formed is 90°, there is indicated a honeycomb formed body which does not have a chamfered portion and has a peripheral surface at right angles to a convex end face.

(2) Mounting Step and Firing Step

A surface of each prepared honeycomb formed body which had the convex end portion was directed downward, and the honeycomb formed body was directly mounted on a shelf plate surface of a shelf plate made of a ceramic material. Additionally, in each of Comparative Examples 7 and 8, a raw setter was interposed between a shelf plate surface and a honeycomb formed body. At this time, lattice directions of partition walls on a raw setter side and cell partition walls of the honeycomb formed body were matched with each other (=0°), and the honeycomb formed body was mounted on the raw setter. In such a state, a shelf plate and the honeycomb formed body were thrown into a firing furnace. Additionally, as respective firing conditions such as firing time and firing temperature, the same conditions were used in Examples 1 to 12 and Comparative Examples 1 to 8.

Furthermore, a flatness when the honeycomb formed body was mounted on the shelf plate was set to 0.2 in each of Examples 1 to 12 and Comparative Examples 1 to 8. Here, the flatness is a difference between a maximum value and a minimum value, when one end face of a honeycomb formed body is directed downward, the honeycomb formed body is mounted on a flat plate and a height of the end face to the flat plate is measured in a vertical direction to the flat plate.

(3) End Face Grinding Step

For each of Examples 1 to 12 and Comparative Examples 1 to 6 obtained in the above (2), an end face grinding step was performed, and the convex end portion was removed, to obtain a honeycomb structure. Each obtained honeycomb structure was evaluated concerning items mentioned below.

(4) Evaluation Item (Change Amount of Roundness Before and after Firing)

A roundness of each of the end face of the honeycomb formed body before fired and an end face of the honeycomb structure after the honeycomb formed body was fired was calculated, and a difference "between the roundness of the honeycomb formed body before fired and the roundness of the honeycomb structure after the honeycomb formed body was fired" was evaluated. Here, the roundness represents a size of a difference (a deviation) from a geometric circle of a round body, and is indicated by a difference between a maximum diameter and a minimum diameter. Here, maximum outer diameters and minimum outer diameters of the honeycomb formed body and the honeycomb structure are measured with a dimension measuring meter (a laser displacement meter), and a value of the roundness is calculated. Additionally, a case where a value of the roundness difference was 0.01 or more was evaluated as "A", a case where the value was from −0.12 to 0.00 was evaluated as "B", and a case where the value was −0.13 or less was evaluated as "C". In this way, three stages of evaluations were carried out. It is to be noted that in a case where the roundness difference is minus, it is meant that the roundness deteriorates before and after the firing.

(5) Evaluation Item (Partition Wall Crack)

A shape of the end face of the honeycomb structure was visually confirmed, and presence/absence of partition wall crack and presence/absence of partition wall deformation generated in the end face of the honeycomb structure in the case of the firing shrinkage were visually judged, respectively. Additionally, as to these judging standards, a case where the crack or the deformation was not recognized was defined as a suitable state and evaluated as "A", a case where a deformation amount was small was defined as an allowable state and evaluated as "B", and a case where noticeable deformation was recognized and was out of an allowable range was evaluated as "C". In this way, three stages of evaluations were carried out. According to such evaluation items, it is possible to grasp a correlation between the honeycomb formed body of the present invention in a case where the honeycomb formed body is directly mounted on the shelf plate and the partition wall crack or the partition wall deformation.

Table 1 mentioned below shows a conclusion of an area ratio R of a convex end face to an outer diameter of a honeycomb forming body of each of Examples 1 to 12 and Comparative Examples 1 to 8, an angle θ to be formed with a shelf plate surface, a flatness, a lattice direction of partition walls, and each evaluation item to each obtained honeycomb structure. It is to be noted that the honeycomb structure of each of the examples and comparative examples for use in evaluation has a round pillar shape, a diameter of 118 mm, a length of 152 mm, a partition wall thickness of 0.076 mm (3 mil), and a cell density of 62 cells/cm$^2$ (400 cells/inch$^2$).

TABLE 1

| | | Honeycomb formed body | | | | | | Evaluation item | |
| | | | | | Bent flat | | Lattice | | |
| | Mounting method | Area ratio R/% | Angle to be formed θ/° | Convex surface height/mm | surface portion width/mm | Flatness | direction of cell partition walls/° | Change of roundness (before firing-after firing) | Partition wall crack |
|---|---|---|---|---|---|---|---|---|---|
| Example 1 | Directly mounted on shelf plate | 16 | 90 | 1.0 | 35.4 | 0.2 | — | 0.22 A | A |
| Example 2 | Directly mounted on shelf plate | 20 | 90 | 1.0 | 32.6 | 0.2 | — | 0.09 A | A |
| Example 3 | Directly mounted on shelf plate | 25 | 90 | 1.0 | 29.5 | 0.2 | — | 0.03 A | A |
| Example 4 | Directly mounted on shelf plate | 30 | 90 | 1.0 | 26.7 | 0.2 | — | −0.10 B | A |
| Example 5 | Directly mounted on shelf plate | 16 | 3 | 1.9 | — | 0.2 | — | 0.15 A | A |
| Example 6 | Directly mounted on shelf plate | 20 | 3 | 1.7 | — | 0.2 | — | 0.08 A | A |
| Example 7 | Directly mounted on shelf plate | 25 | 3 | 1.5 | — | 0.2 | — | −0.01 B | A |
| Example 8 | Directly mounted on shelf plate | 30 | 3 | 1.4 | — | 0.2 | — | −0.12 B | B |
| Example 9 | Directly mounted on shelf plate | 16 | 45 | 1.0 | 34.4 | 0.2 | — | 0.18 A | A |
| Example 10 | Directly mounted on shelf plate | 18 | 45 | 1.0 | 33.0 | 0.2 | — | 0.15 A | A |
| Example 11 | Directly mounted on shelf plate | 26 | 45 | 1.0 | 27.9 | 0.2 | — | 0.05 A | A |
| Example 12 | Directly mounted on shelf plate | 28 | 45 | 1.0 | 26.8 | 0.2 | — | −0.03 B | B |
| Comparative Example 1 | Directly mounted on shelf plate | 36 | 90 | 1.0 | 23.6 | 0.2 | — | −0.24 C | B |
| Comparative Example 2 | Directly mounted on shelf plate | 40 | 90 | 1.0 | 21.7 | 0.2 | — | −0.26 C | B |
| Comparative Example 3 | Directly mounted on shelf plate | 100 | 90 | — | — | 0.2 | — | −0.33 C | C |
| Comparative Example 4 | Directly mounted on shelf plate | 36 | 3 | 1.2 | — | 0.2 | — | −0.24 C | B |
| Comparative Example 5 | Directly mounted on shelf plate | 40 | 45 | 1.0 | 20.7 | 0.2 | — | −0.22 C | B |
| Comparative Example 6 | Directly mounted on shelf plate | 80 | 45 | 1.0 | 5.2 | 0.2 | — | −0.28 C | C |
| Comparative Example 7 | Raw setter | 100 | — | — | — | 0.2 | 0 | −0.17 C | A |
| Comparative Example 8 | Raw setter | 85 | — | — | — | 0.2 | 0 | −0.13 C | A |

Considerations: Examples 1 to 12

As shown in Table 1, in a case where each of parameters such as an area ratio R and an angle θ to be formed was in a defined range of a honeycomb formed body of the present invention, a suitable evaluation was obtained in each of evaluation items such as change of roundness and partition wall crack. Consequently, it has been confirmed that the honeycomb formed body of the present invention can isotropically perform a firing shrinkage in a firing step and any restriction due to the firing shrinkage is not generated between the vicinity of a circumferential edge of one end face of the honeycomb formed body and a shelf plate surface of a shelf plate. Especially in any case where an area ratio R was 20% or less (each of Examples 1, 2, 5, 6, 9 and 10), a roundness difference was 0.01 or more and evaluation was "A" and evaluation concerning the partition wall crack was also "A". Furthermore, also in a case where a chamfered portion was formed in a convex end portion, a difference was not noticeably recognized in each evaluation item. That is, when a convex end portion having a side surface perpendicular to the shelf plate surface is formed as in the honeycomb formed body of the present embodiment, processing of end face grinding might be complicated, and much time and cost might be required to form such a convex end portion. On the other hand, it has been confirmed that the convex end portion having a chamfered portion is comparatively easily formed and an effect can sufficiently be obtained.

Considerations: Comparative Examples 1 to 8

On the other hand, in a case where an area ratio R was in excess of 30% (Comparative Examples 1 to 6), i.e., a case where a contact area with a shelf plate surface was large, a restriction due to a firing shrinkage was easy to be received. Therefore, evaluation of a change of roundness was "C" in any case, and a difference was not noticeably recognized in evaluation result due to presence/absence of a chamfered portion. In Comparative Examples 7 and 8, a honeycomb formed body was mounted on a conventional raw setter, a firing shrinkage was caused between the honeycomb formed body and the raw setter, and the change of the roundness was low.

As shown in Examples 1 to 12 and Comparative Examples 1 to 8 mentioned above, when a honeycomb formed body satisfying conditions that an area ratio R is from 15 to 30% and further preferably 20% or less is used, it is possible to manufacture a honeycomb structure in which roundness suitably changes without using a setter or without deforming partition walls of cells.

A manufacturing method of a honeycomb structure of the present invention and a honeycomb formed body are usable in manufacturing of a honeycomb structure which can be utilized in a car exhaust gas purifying catalyst carrier, a diesel particulate removing filter, a heat reservoir for a burning device or the like.

DESCRIPTION OF REFERENCE NUMERALS

1, 40 and 50: honeycomb formed body, 2a, 41 and 51: one end face, 2b: the other end face, 2c and 55: flat surface portion, 3, 42 and 52: convex end portion, 3a, 42a and 52a: convex end face, 4, 43 and 53: corner portion, 5: cell, 6: partition wall, 7: clearance space, 10: shelf plate, 11: shelf plate surface, 20: honeycomb fired body, 21: ground and removed portion, 44 and 54: chamfered portion, 54a: one end of the chamfered portion, 100: manufacturing method of a honeycomb structure, H: convex end portion height, R: area ratio, R1: sectional area of the honeycomb formed body, R2: area of the convex end face, X: central axis direction, and θ: angle to be formed.

What is claimed is:

1. A manufacturing method of a honeycomb structure comprising:
    a forming step of forming a forming raw material, and forming a honeycomb formed body having partition walls defining a plurality of cells which extend from one end face to the other end face and which become through channels for a fluid, by extrusion, cutting and drying;
    an end portion forming step of forming an end portion projecting from the vicinity of a center of the one end face of the honeycomb formed body obtained by the forming step along a central axis direction of the honeycomb formed body and comprising a planar end face;
    a mounting step of directing downward the side of the one end face on which the end portion is formed, and mounting the honeycomb formed body on a shelf plate so that a part of the end portion abuts on a shelf plate surface;
    a firing step of firing the honeycomb formed body mounted on the shelf plate, to form a honeycomb fired body; and
    an end face grinding step of grinding the one end face of the honeycomb fired body obtained by the firing step, to remove the end portion.

2. The manufacturing method of the honeycomb structure according to claim 1,
    wherein the end portion includes a peripheral surface perpendicular to the end face, and possesses a thin disc form.

3. The manufacturing method of the honeycomb structure according to claim 1,
    wherein the end portion further has a chamfered portion obtained by chamfering the one end face in an oblique direction and having a cross section possessing a tapered shape in which a diameter of the end face is smaller than an outer diameter of the honeycomb formed body.

4. The manufacturing method of the honeycomb structure according to claim 3,
    wherein the end portion further has a flat surface portion which is bent from one end of the chamfered portion to become parallel to the end face.

5. The manufacturing method of the honeycomb structure according to claim 1,
    wherein an area ratio R of an area of the end face to a sectional area of the honeycomb formed body is from 15 to 30%.

6. The manufacturing method of the honeycomb structure according to claim 1,
    wherein a height of the end portion from a corner portion of the one end face is from 0.3 to 3 mm.

7. The manufacturing method of the honeycomb structure according to claim 1,
    wherein a thickness of a ground and removed portion to remove the end portion is from 0.5 to 3 mm.

* * * * *